(12) United States Patent
Sron

(10) Patent No.: US 10,122,949 B2
(45) Date of Patent: Nov. 6, 2018

(54) HIGH-RESOLUTION CAMERA UNIT FOR A DRONE, WITH CORRECTION OF THE WOBBLE-TYPE DISTORTIONS

(71) Applicant: PARROT DRONES, Paris (FR)

(72) Inventor: Eng Hong Sron, Paris (FR)

(73) Assignee: Parrot Drones, Paris (FR)

(*) Notice: Subject to any disclaimer, the term of this patent is extended or adjusted under 35 U.S.C. 154(b) by 98 days.

(21) Appl. No.: 15/188,441

(22) Filed: Jun. 21, 2016

(65) Prior Publication Data

US 2017/0006240 A1  Jan. 5, 2017

(30) Foreign Application Priority Data

Jun. 30, 2015 (FR) .................................... 15 56105

(51) Int. Cl.
| | |
|---|---|
| *H04N 5/357* | (2011.01) |
| *G06T 3/00* | (2006.01) |
| *G06T 5/50* | (2006.01) |
| *B64C 27/08* | (2006.01) |
| *B64C 39/02* | (2006.01) |

(Continued)

(52) U.S. Cl.
CPC ............. *H04N 5/357* (2013.01); *B64C 27/08* (2013.01); *B64C 39/024* (2013.01); *B64D 47/08* (2013.01); *G06T 3/00* (2013.01); *G06T 5/50* (2013.01); *H04N 5/247* (2013.01); *H04N 9/045* (2013.01);
(Continued)

(58) Field of Classification Search
CPC .......... H04N 5/357; H04N 5/50; H04N 5/247; H04N 9/045; B64C 27/08; B64C 39/024; B64D 47/08; G06T 5/50; G06T 3/00; G06T 2207/10032; G06T 2207/30181
See application file for complete search history.

(56) References Cited

U.S. PATENT DOCUMENTS

| | | | | |
|---|---|---|---|---|
| 8,686,943 B1 * | 4/2014 | Rafii | ....................... | G06F 3/017 345/158 |
| 8,723,789 B1 * | 5/2014 | Rafii | ....................... | G06F 3/017 345/156 |

(Continued)

OTHER PUBLICATIONS

Daren Turner et al.,"Spatial Co-Registration of Ultra-High Resolution Visible, Multispectral and Thermal Images Acquired with a Micro-UAV over Antarctic Moss Beds", Remote Sensing, ISSN 2072-4292, www.mdpi.com/journal/remotesensing, Remote Sens. 2014,6, 4003-4024, May 2, 2015.

(Continued)

*Primary Examiner* — Michael E Teitelbaum
(74) *Attorney, Agent, or Firm* — Haverstock & Owens LLP

(57) ABSTRACT

This camera unit (14) comprises a high-resolution rolling shutter camera (16) and one or several low-resolution global shutter cameras (18), for example monochromic spectral cameras. All the cameras are oriented in the same direction and are able to be triggered together to collect simultaneously a high-resolution image ($I_0$) and at least one low-resolution image ($I_1$-$I_4$) of a same scene viewed by the drone. Image processing means (22) determine the distortions of the wobble type present in the high-resolution image and absent from the low-resolution images, and combine the high-resolution image ($I_0$) and the low-resolution images ($I_1$-$I_4$) to deliver as an output a high-resolution image ($I'_0$) corrected for these distortions.

7 Claims, 2 Drawing Sheets

(51) Int. Cl.
*B64D 47/08* (2006.01)
*H04N 5/247* (2006.01)
*H04N 9/04* (2006.01)

(52) U.S. Cl.
CPC .................. *B64C 2201/024* (2013.01); *G06T 2207/10032* (2013.01); *G06T 2207/30181* (2013.01)

(56) References Cited

U.S. PATENT DOCUMENTS

| | | | | |
|---|---|---|---|---|
| 2008/0278610 | A1* | 11/2008 | Boettiger | H04N 5/2253 |
| | | | | 348/273 |
| 2011/0176014 | A1* | 7/2011 | Hong | H04N 5/145 |
| | | | | 348/208.4 |
| 2011/0260059 | A1* | 10/2011 | Jiang | H01L 27/1461 |
| | | | | 250/330 |

OTHER PUBLICATIONS

Erik Ringaby, "Geometric Models for Rolling-shutter and Pushbroom Sensor",Linkoping Studies in Science and Technology Dissertation No. 1615, ISBN 978-91-7519-255-0, ISSN: 0345-7524.
Pix4D Introduction Guide, Oct. 2013.
Alexandre Karpenko et al., "Digital Video Stabilization and Rolling Shutter Correction using Gyroscopes", Stanford Tech Report CTSR Mar. 2011, p. 1-8.
The Search Report from the French application FR1556105.

* cited by examiner

HIGH-RESOLUTION CAMERA UNIT FOR A DRONE, WITH CORRECTION OF THE WOBBLE-TYPE DISTORTIONS

The invention relates to the processing of digital images captured by a camera on board a mobile apparatus, in particular a motorized flying device such as a drone.

The invention advantageously applies to the images collected by the camera of a fixed-wing drone, in particular of the "flying wing" type such as the eBee model of SenseFly, Cheseaux-Lausanne, Suisse, which is a professional land mapping drone, used in particular in agronomy for the follow-up of agricultural crops.

The invention also applies to other types of drones, for example the rotary-wing drones such as quadricopters, one typical example of which is the Bebop Drone of Parrot SA, Paris, France, which, in addition to a front camera, is equipped with a vertical-view camera collecting an image of the land overflown by the drone.

To obtain a fine map representation of the overflown land, the camera used by the drone is a camera producing a high-definition RGB colour image (typically at least 12 Mpixel, possibly 20 or even 40 Mpixel).

The cameras able to fulfil such specifications are cameras provided with a sensor of the rolling shutter type, which is a sensor in which the pixels of the sensor are read row by row, the exposure of the photosites and the reading of the successive rows of the sensor occurring concurrently.

Another type of sensor exists, called "global shutter" sensor, which operates in two distinct steps, with an initial phase of exposure of the sensor photosites, followed by a phase of global reading of the pixel data after the photosites have been exposed.

One of the drawbacks of the global shutter sensors is their relatively low definition, very lower than that of the rolling shutter sensors (or else for a prohibitive cost), as well as their lower sensitivity because, for the whole duration of the reading phase, the photosites are not exposed, unlike a rolling shutter sensor in which the photosites are exposed for a far longer time, even during the row-by-row reading.

On the other hand, the rolling shutter sensors have a major drawback that is the distortions undergone by the image due to external phenomena. Indeed, with a rolling shutter sensor the scene is not entirely "frozen", but the rows constituting the image being not acquired at the same time for all the pixels of the image, the various movements occurring during the capture of an image generate within the latter distortions that are not the same from one row to the following one.

In particular, the changes of attitude of the drone as well as the vibrations of the motors, etc., occurring during the capture of an image generate a well-known defect, called wobble, which is an image blurring and distortion effect, in which rectilinear elements of the scene are typically rendered as a wavy line in the image delivered at the output of the sensor.

When the wobble effect results from changes of attitude of the drone, it is possible to correct efficiently this defect using the measurements of the inertial unit of the drone, which delivers signals representative of the instantaneous rotations of the drone, and hence of the camera, in the three pitch, roll and yaw axes. As soon as the drone attitude may be accurately acquired for each of the rows in synchronism with the camera sensor, the application of a transform inverse to the gyrometer measurement allows compensating in real time the image distortions. A technique of this type is described in particular in EP 2 933 775 A1 (published on Oct. 21, 2015, corresponding to French application FR 14 56302 of Jul. 2, 2014, entitled "*Drone á voilure tournante muni d'une caméra video délivrant des séquences d'images stabilisées*"), in the name of the applicant.

This technique of correction allows above all eliminating the wobble due to the rotations, typical artefact of the rotary-wing drones such as quadricopters.

In the case of the fixed-wing drones, for example those of the "flying wing" type, this type of correction is not much efficient, especially when the drone moves rapidly with respect to the captured scene. Indeed, the principle of row-by-row operation of the rolling shutter sensor induces therein complex distortions, difficult to anticipate, depending on the speed and the structure of the captured scene.

That way, none of the two sensor types is really satisfying: a camera equipped with a rolling shutter sensor will produce an image of high definition, but subjected to multiple and unforeseeable distortions, whereas a camera equipped with a global shutter sensor will produce an image devoid of distortions (the scene captured being that which has been "frozen" at the end of the exposure phase, just before the beginning of the reading phase), but with a far lower resolution and also a lower sensitivity.

The object of the invention is to propose a new type of camera unit that combines the respective advantages of the two global shutter and rolling shutter sensors, but without the drawbacks thereof, i.e. a camera unit that has the following advantages:

high resolution and high sensitivity (typical advantage of a conventional rolling shutter sensor);

absence of distortions in the image, in particular wobble effect (advantage peculiar to the global shutter sensors); and the whole being made from current wide-spread components, of a reasonable cost.

The starting point of the invention is the observation that some drones take on board a camera unit incorporating in a same unit cameras provided with both types of sensors.

Such is the case in particular of the drones used in professional mapping, for example for controlling crops, hydrography, etc., which are provided with both a main camera of the rolling shutter type, giving a high-resolution RGB image of the overflown land, and at least one (generally several) narrow-band monochromic camera for the spectral analysis of the overflown land. These spectral cameras measure in particular in different bands the reflectance of the crops, i.e. the quantity of light reflected by the leaves, in order to obtain information about the state of the photosynthesis.

These spectral cameras are monochromic and relatively low-resolution (typically of the order of 1 Mpixel) global shutter cameras operating on a narrow band of the spectrum (green, red, near infrared, etc.) and that do not provide a quality of image which can be exploited as such for other purposes than the spectral analysis.

The basic idea of the invention consists in using the image(s) delivered by the spectral cameras (monochromic images of low resolution, but devoid of distortions due to the principle of operation of their global shutter sensor) to correct the distortions of the image of the main rolling shutter camera (which is a camera giving RGB images of high definition, but subjected to the distortions explained hereinabove).

More precisely, the invention proposes a camera unit comprising, in a manner known in itself, a camera of the rolling shutter type including a digital sensor of a first, high resolution, and at least one camera of the global shutter type including a digital sensor of a second, low resolution, lower than said first resolution. The rolling shutter camera and the at least one global shutter have their optical axes oriented in the same direction and are able to be triggered together so as to collect simultaneously a high-resolution image and at least one low-resolution image of a same scene viewed by the drone.

Characteristically of the invention, the camera unit also comprises image processing means, adapted: to determine distortions of the wobble type present in the high-resolution image and absent from the at least one low-resolution image; and to combine the high-resolution image and the at least one low-resolution image to deliver as an output a high-resolution image corrected for said distortions.

In a first mode of implementation, the image processing means comprise means adapted to:
  search for points of interest in the high-resolution image and in the at least one low-resolution image;
  map the respective points of interest of the high-resolution image with those of the at least one low-resolution image;
  calculate the respective displacements of the points of interest of the high-resolution image with the corresponding points of interest of the at least one low-resolution image;
  determine a transform defined by all said displacements; and
  apply to the high-resolution image a transformation inverse to said transformation.

In a second mode of implementation, the image processing means comprise means adapted to:
  construct a representation of the scene from the at least one low-resolution image;
  determine the movements of the camera unit undergone for the duration of the high-resolution image collection, from signals delivered by gyrometer, accelerometer and/or geolocation sensors of the drone; and
  project point by point, taking said movements into account, each pixel of the high-resolution image as a texture on said representation of the scene constructed from the at least one low-resolution image.

According to various subsidiary advantageous characteristics:
  the rolling shutter camera is an RGB camera;
  the at least one global shutter camera is a monochromic camera;
  the at least one global shutter camera is a set of four narrow-band spectral cameras;
  the resolution of the sensor of the rolling shutter camera is at least 12 Mpixel;
  the resolution of the sensor of the at least one global shutter camera is of at least 1 Mpixel.

The invention also relates to a method of image processing, comprising in a manner known in itself:
  the acquisition of an image at a first, high resolution, delivered by a camera of the rolling shutter type;
  the acquisition of at least one image at a second, low resolution, lower than said first resolution, delivered by at least one respective camera of the global shutter type;
  the rolling shutter camera and the at least one global shutter camera having their optical axes oriented in the same direction and being able to be triggered together so as to collect simultaneously said high-resolution image and said at least one low-resolution image of a same scene viewed by the drone.

Characteristically, this method further comprises:
  the determination of distortions of the wobble type present in the high-resolution image and absent from the at least one low-resolution image;
  the combination of the high-resolution image and of the at least one low-resolution image to deliver as an output a high-resolution image corrected for said distortions.

In a first mode of implementation, the method comprises steps of:
  searching for points of interest in the high-resolution image and in the at least one low-resolution image;
  mapping the respective points of interest of the high-resolution image with those of the at least one low-resolution image;
  calculating the respective displacements of the points of interest of the high-resolution image with the corresponding points of interest of the at least one low-resolution image;
  determining a transform defined by all said displacements; and
  applying to the high-resolution image a transformation inverse to said transformation.

In a second mode of implementation, the method comprises steps of:
  constructing a representation of the scene from the at least one low-resolution image;
  determining the movements of the camera unit undergone for the duration of the high-resolution image collection, from signals delivered by gyrometer, accelerometer and/or geolocation sensors of the drone;
  projecting point by point, taking said movements into account, each pixel of the high-resolution image as a texture on said representation of the scene constructed from the at least one low-resolution image.

An example of implementation of the present invention will now be described, with reference to the appended drawings in which the same reference denote identical or functionally similar elements throughout the figures.

Exemplary embodiments and implementations of the invention will now be described.

Figure 1:
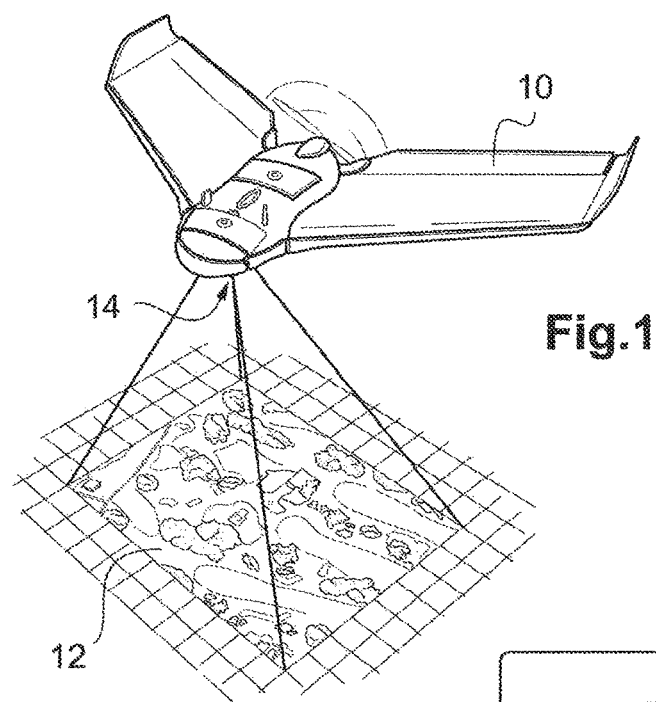
FIG. 1 is an overall view showing a drown flying over a land whose scene is captured by an on-board camera.

In FIG. 1 is illustrated a drone 10, for example a fixed-wing drone of the "flying wing" type, such as the eBee of SenseFly, flying over a land 12, the map of which will be made by the drone. For that purpose, the drone is provided with a vertical-view camera unit 14, turned towards the land so as to capture the image of a scene formed of an approximately rectangular portion of this land.

Figure 2:
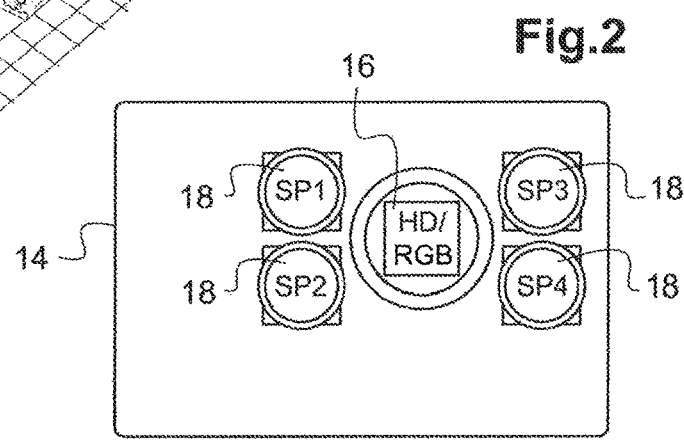
FIG. 2 shows the general structure of a camera unit comprising a high-definition rolling shutter camera and four global shutter spectral cameras.

FIG. 2 shows more precisely the different elements of the camera unit 14 that, in this example, comprises a set of five cameras 16, 18, whose optical axes are all oriented in the same direction, i.e. the vertical direction, the five cameras each delivering an image approximately of the same scene 16 overflown by the drone.

The camera unit 14 comprises a high-definition HD camera, denoted 16, of the rolling shutter type, for example of resolution 12 Mpixel or more (20 to 40 Mpixel) delivering an RGB image in all the colours of the visible spectrum.

The unit 14 also comprises four spectral cameras SP1 ... SP4, denoted 18, which are monochromic, low-resolution (typically 1 Mpixel) cameras, of the global shutter type. These four cameras 18 are identical, except the spectrum band to which they are sensitive. In an application to agriculture, these bands are for example narrow bands located in: the green, the red, the extreme red (red edge) and the near infrared.

Figure 3:
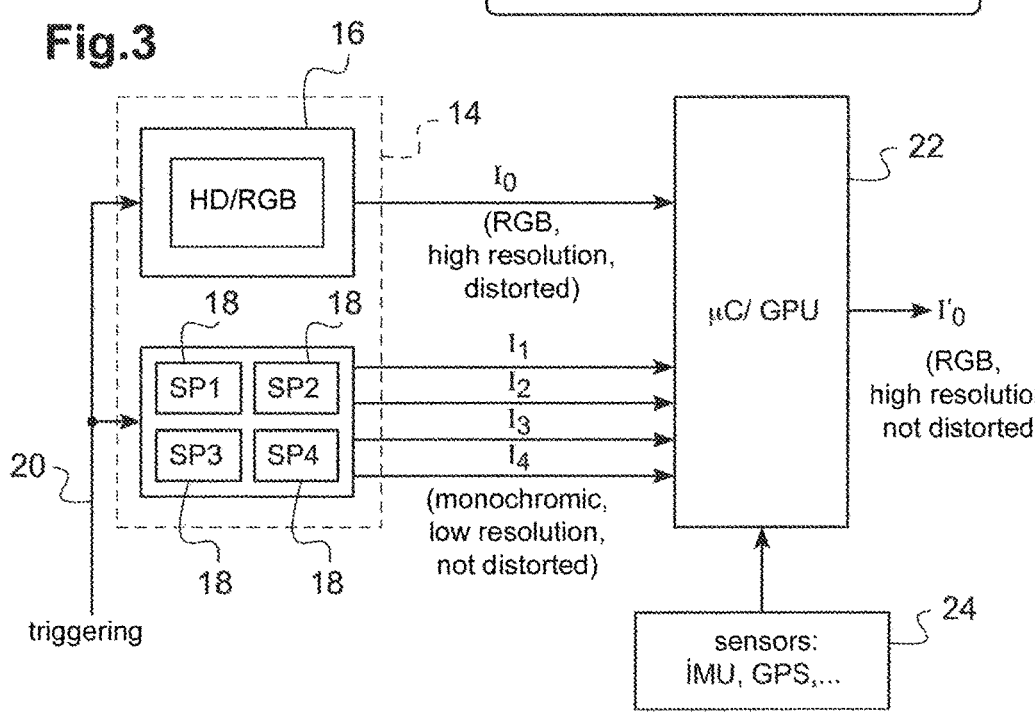
FIG. 3 illustrates as block-diagrams different elements allowing obtaining, from a plurality of images generated by the camera unit of FIG. 2, a high-resolution image devoid of distortions.

As illustrated in FIG. 3, the five cameras 16 and 18 are triggered simultaneously by a common signal 20, and deliver respectively:

for the rolling shutter camera 16: an image signal $I_0$, which is a high-resolution RGB signal, and for the four global shutter spectral cameras 18: respective image signals $I_1$-$I_4$, which are monochromic, low-resolution signals.

Those signals $I_0$, on the one hand, and $I_1$-$I_4$, on the other hand, are combined in a unit 22 allowing, in the manner that will be exposed hereinafter, eliminating the distortions present in the image $I_0$ (distortions inherent to the use of a rolling shutter camera) from the images $I_1$-$I_4$ produced by the spectral cameras 18 (images that are not distorted, due to the use of a global shutter sensor, but that are monochromic and low-resolution images).

The unit 22 may also receive gyrometer information and/or geolocation information (GPS) produced by the inertial unit (IMU) of the drone or by on-board sensors (unit schematized by the unit 24).

The processing operated by the unit 22 may be a processing operated in real time, on the fly, by a microcomputer or by a dedicated graphic processing unit (GPU).

It may also be executed as a post-processing, the drone recording separately the images $I_0$ and $I_1$-$I_4$ to obtain afterward the image $I'_0$ cleared from the distortions.

First Mode of Implementation of the Invention

Figure 4:
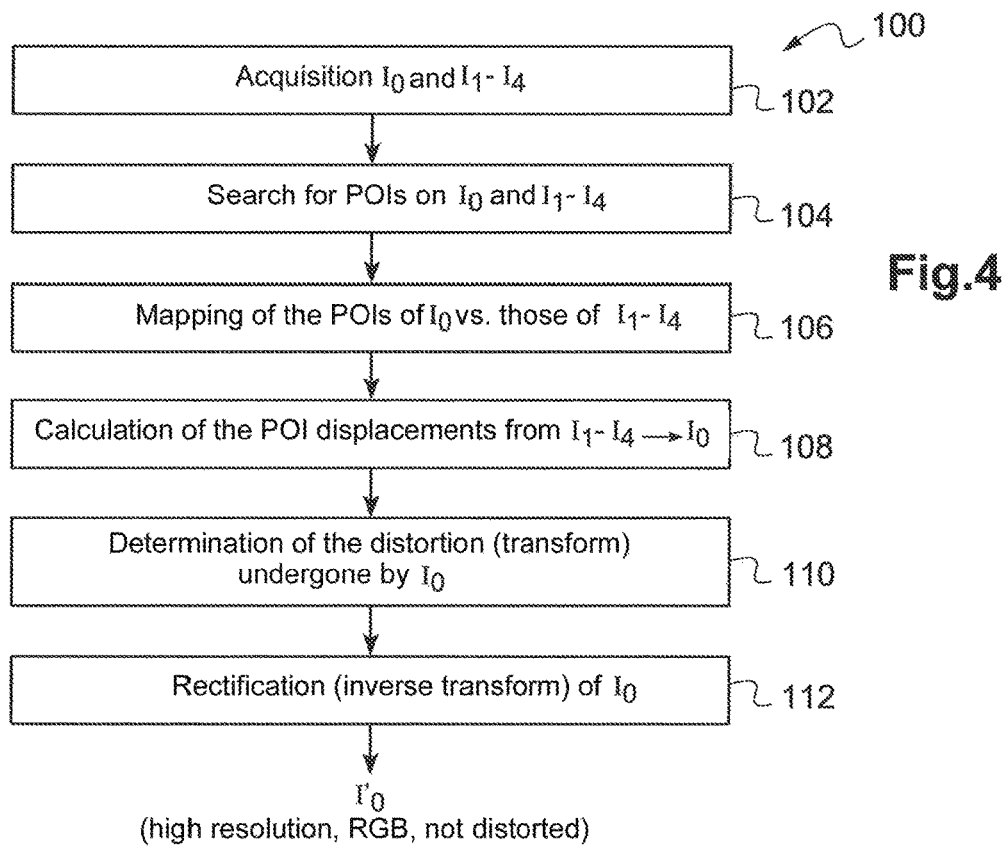
FIG. 4 is a flow diagram illustrating the different steps of a first mode of implementation of the invention.

FIG. 4 illustrates, as a flow diagram 100, the different steps of a first mode of implementation of the invention.

The first step (block 102) consists in acquiring the image data $I_0$ and $I_1$-$I_4$ captured simultaneously by the high-definition rolling shutter camera 16 and the four global shutter spectral cameras 18.

On each of the images, the method searches (block 104) for points of interest (POI), for example by means of a corner detecting algorithm of the FAST (Features from Accelerated Segment Test) type.

As the high-definition camera 16 and the four spectral cameras 18 have their optical axes oriented in the same direction (substantially the vertical direction), it will be considered that the images given by the four spectral cameras 18, which are the non-distorted images of the scene, are perfectly aligned, hence providing four estimations of the position per point of interest, which allows improving the final result.

It will also be noted that a time integration, over several images, allows substantially improving the correction, by reducing the effects of the fugitive artefacts appearing only on one isolated image.

Once the points of interest acquired, the method searches for correspondences (step 106) between the POIs of the image $I_0$, on the one hand, and those of the images $I_1$ to $I_4$, on the other hand, so as to determine those of the POI that are present both on the image $I_0$ and on one or several of the images $I_1$ to $I_4$. When two corresponding respective POIs are found on $I_0$ and $I_1$-$I_4$, these latter are memorized, with their position on each of the images.

The following step (block 108) consists in calculating, from the obtained data, the displacement of each of the points of interest between the image $I_1$-$I_4$ (non-distorted image) and the corresponding image $I_0$ (distorted image).

All the so-calculated displacements allow determining (block 110), a transform representative of the distortion undergone by $I_0$ with respect to the non-distorted images $I_1$-$I_4$.

It is then possible (step 112) to apply to $I_0$ a transform inverse to the transform determined at the preceding step, so as to rectify the distorted high-resolution image $I_0$ into a non-distorted high-resolution image $I'_0$.

It is to be noted that the analysis of the high-resolution image after correction of the distortions allows, subsidiary, determining the depths of each point of interest by analysis of the successive images, i.e. the component following the direction of the optical axis between the camera and the point of interest on the land (the optical axis being the axis Z in a reference system X, Y, Z linked to the camera, X and Y being the coordinates on the left/right and top/bottom axes, with respect to the image).

Second Mode of Implementation of the Invention

Figure 5:
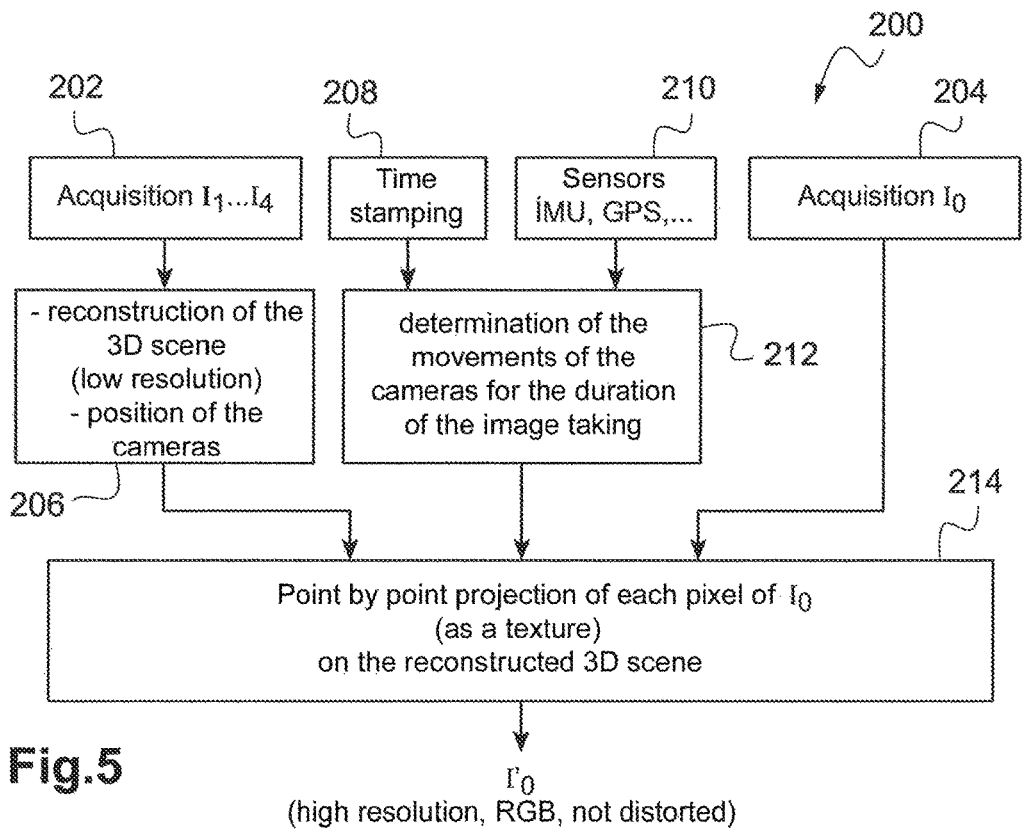
FIG. 5 is a diagram illustrating the different steps of a second mode of implementation of the invention.

FIG. 5 illustrates as a diagram 200 the different steps of a second mode of implementation of the invention.

As in the preceding case, the image data $I_0$ and $I_1$-$I_4$ delivered by the high-definition camera 16 and by the four spectral cameras 18, respectively, are acquired simultaneously (blocks 202 and 204).

The following step (block 206) consists in operating a three-dimensional reconstruction of the scene of the overflown land from the images (low definition) delivered by the spectral cameras $I_1$-$I_4$. This step may be implemented with software programs such as Pix4Dmapper of Pix4D, Lausanne, Swiss.

This step allows establishing a representation of the topology of the land with the position of the cameras with respect to the latter, for each image taken.

Moreover, from an accurate timestamping (block 208) of the images taken by the high-definition rolling shutter camera 16 and of the information delivered by the gyrometer and/or geolocation sensors placed on board the drone (block 210), it is possible to determine (block 212) the movements of the drone, and hence of the cameras, for the duration of the image taking (block 212), knowing the orientation of the camera for each pixel of the image.

It is then operated (block 214) a point-by-point projection of each pixel of the image $I_0$ (high definition, distorted), as a texture, on the 3D scene (low resolution, not distorted) reconstructed at the preceding step (206).

The application of a texture (herein the distorted image obtained by the rolling shutter camera 16) on a 3D scene as a texture is a step known in itself, used in most of the 3D software programs, in particular that which is mentioned hereinabove.

The result of this projection is the image $I'_0$, which is a high-resolution RGB image, rectified for the distortions present in the image $I_0$.

The invention claimed is:
1. A camera unit (14) adapted to be placed on board a drone (10), comprising:
a camera of the rolling shutter type (16) including a digital sensor of a first, high resolution; and at least one camera of the global shutter type (18) including a digital sensor of a second, low resolution, lower than said first resolution, the rolling shutter camera and the at least one global shutter having their optical axes oriented in the same direction and being able to be triggered together so as to collect simultaneously a high-resolution image ($I_0$) and at least one low-resolution image ($I_1$-$I_4$) of a same scene (12) viewed by the drone, image processing means (22), adapted to:
- determine distortions of the wobble type present in the high-resolution image and absent from the at least one low-resolution image;
- combine the high-resolution image ($I_0$) and the at least one low-resolution image ($I_1$-$I_4$) to deliver as an output a high-resolution image ($I'_0$) corrected for said distortions;
- construct (206) a representation of the scene from the at least one low-resolution image ($I_1$-$I_4$);
- determine (212) the movements of the camera unit undergone for the duration of the high-resolution image ($I_0$) collection, from signals delivered by gyrometer, accelerometer and/or geolocation sensors; and
- project point by point (214), taking said movements into account, each pixel of the high-resolution image ($I_0$) as a texture on said representation of the scene constructed from the at least one low-resolution image ($I_1$-$I_4$).

2. The camera unit of claim 1, wherein the rolling shutter camera (16) is an RGB camera.

3. The camera unit of claim 1, wherein the at least one global shutter camera (18) is a monochromic camera.

4. The camera unit of claim 3, wherein the at least one global shutter camera (18) is a set of four narrow-band spectral cameras.

5. The camera unit of claim 1, wherein the resolution of the sensor of the rolling shutter camera (16) is of at least 12 Mpixel.

6. The camera unit of claim 1, wherein the resolution of the sensor of the at least one global shutter camera (18) is of at least 1 Mpixel.

7. An image processing method, comprising:
- acquiring (102; 204) an image ($I_0$) at a first, high resolution, delivered by a camera of the rolling shutter type (16);
- acquiring (102; 202) at least one image ($I_1$-$I_4$) at a second, low resolution, lower than said first resolution, delivered by at least one respective camera of the global shutter type (18), the rolling shutter camera and the at least one global shutter camera having their optical axes oriented in the same direction and being able to be triggered together so as to collect simultaneously said high-resolution image ($I_0$) and said at least one low-resolution image ($I_1$-$I_4$) of a same scene (12) viewed by the drone, characterized in that it further comprises:
- determining distortions of the wobble type present in the high-resolution image and absent from the at least one low-resolution image;
- combining the high-resolution image ($I_0$) and of the at least one low-resolution image ($I_1$-$I_4$) to deliver as an output a high-resolution image corrected for said distortions;
- constructing (206) a representation of the scene from the at least one low-resolution image ($I_1$-$I_4$);
- determining (212) the movements of the camera unit undergone for the duration of the low-resolution image ($I_0$) collection, from signals delivered by gyrometer, accelerometer and/or geolocation sensors; and
- projecting point by point (214), taking said movements into account, each pixel of the high-resolution image ($I_0$) as a texture on said representation of the scene constructed from the at least one low-resolution image ($I_1$-$I_4$).

* * * * *